(12) United States Patent
Reeve et al.

(10) Patent No.: US 6,328,283 B1
(45) Date of Patent: *Dec. 11, 2001

(54) METHOD AND APPARATUS FOR INSTALLING TRANSMISSION LINES

(75) Inventors: Michael H. Reeve; Stephen A. Cassidy, both of Ipswich (GB)

(73) Assignee: British Telecommunications public limited company, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 09/543,555

(22) Filed: Apr. 5, 2000

Related U.S. Application Data

(63) Continuation of application No. 08/852,956, filed on May 8, 1997, which is a division of application No. 08/460,268, filed on Jun. 2, 1995, now Pat. No. 5,645,267, which is a division of application No. 07/970,464, filed on Nov. 2, 1992, now Pat. No. 5,456,450, which is a division of application No. 07/554,927, filed on Jul. 20, 1990, now Pat. No. 5,169,126, which is a continuation of application No. 07/086,849, filed on Aug. 19, 1987, now Pat. No. 4,948,097, and a continuation-in-part of application No. 06/848,950, filed on Apr. 7, 1986, now Pat. No. 4,691,896, which is a continuation of application No. 06/551,640, filed on Nov. 8, 1983, now abandoned.

(30) Foreign Application Priority Data

Nov. 8, 1982 (GB) .................................................. 8231840
Aug. 4, 1983 (GB) .................................................. 8309671

(51) Int. Cl.$^7$ ........................................................ B60F 3/24

(52) U.S. Cl. ................................ 254/134.4; 254/134.3 R

(58) Field of Search .................... 254/134.3 R, 134.3 IT, 254/134.4; 350/96.21

(56) References Cited

U.S. PATENT DOCUMENTS

| | | |
|---|---|---|
| 2,515,953 | 7/1950 | Dufrense . |
| 2,690,002 | 9/1954 | Grenell . |
| 3,283,123 | 11/1966 | Atkinson . |
| 3,553,423 | 1/1971 | Doxey . |
| 3,610,582 | 10/1971 | Passoni .............................. 254/134.3 |
| 3,654,114 | 4/1972 | Brandstaetter ....................... 204/206 |
| 3,793,732 | 2/1974 | Hamrick ............................ 254/134.4 |
| 4,082,423 | 4/1978 | Glista et al. ...................... 350/96.23 |
| 4,087,748 | 5/1978 | Pigeon . |
| 4,105,284 | 8/1978 | Olshansky .......................... 350/96.33 |
| 4,181,403 | 1/1980 | Macedo et al. .................... 350/96.33 |
| 4,185,809 | 1/1980 | Jonnes .............................. 254/134.4 |
| 4,230,395 | 10/1980 | Dean et al. ....................... 350/96.23 |

(List continued on next page.)

FOREIGN PATENT DOCUMENTS

| | | |
|---|---|---|
| 214452 | 2/1957 | (AU) . |
| 231245 | 7/1958 | (AU) . |
| 250437 | 9/1960 | (AU) . |

(List continued on next page.)

OTHER PUBLICATIONS

"The Blown Fiber Cable", by Hornung et al, IEEE Journal on Selected Areas in Communications, vol. SAC–4, No. 5, 08/1986; pp. 679–685.

(List continued on next page.)

*Primary Examiner*—Eileen P. Morgan
(74) *Attorney, Agent, or Firm*—Nixon & Vanderhye PC

(57) ABSTRACT

A transmission line, such as an optical fiber (or wire) transmission line, is installed by first installing a conduit having one or more bores and subsequently inserting flexible, lightweight optical fiber members containing the optical fibers into the bores. The optical fiber members are propelled by employing the fluid drag of air, or another suitable gas, passed at high velocity through the bores.

16 Claims, 4 Drawing Sheets

U.S. PATENT DOCUMENTS

| | | |
|---|---|---|
| 4,248,035 | 2/1981 | Skillen et al. ................... 350/96.23 |
| 4,332,436 | 6/1982 | Adorni et al. .................... 350/96.23 |
| 4,372,792 | 2/1983 | Dey et al. .............................. 156/48 |
| 4,408,378 | 10/1983 | Ketteringham ....................... 289/242 |
| 4,414,942 | 11/1983 | Itoh et al. ............................. 123/339 |
| 4,446,686 | 5/1984 | Panuska et al. .................. 350/96.23 |
| 4,520,531 | 6/1985 | Hergeth . |
| 4,552,433 | 11/1985 | Titchmarsh et al. ............. 350/96.23 |
| 4,558,308 | 12/1985 | Ciordinik et al. . |
| 4,640,576 | 2/1987 | Eastwood .......................... 350/96.23 |
| 4,644,791 | 2/1987 | Sonoda . |
| 4,659,174 | 4/1987 | Ditscheid et al. ................ 350/96.23 |
| 4,691,896 | 9/1987 | Reeve et al. ....................... 254/134.4 |
| 4,702,404 | 10/1987 | Einsle ...................................... 226/7 |
| 4,756,510 | 7/1988 | Klamm .............................. 254/134.4 |
| 4,796,970 | 1/1989 | Reeve et al. ...................... 254/134.4 |
| 4,850,569 | 7/1989 | Griffioen et al. . |
| 4,856,760 | 8/1989 | Frost et al. ........................ 254/134.4 |
| 4,856,937 | 8/1989 | Grocott . |
| 4,934,662 | 6/1990 | Griffioen et al. . |
| 4,948,097 | 8/1990 | Reeve et al. ...................... 254/134.4 |
| 4,953,827 | 9/1990 | Araki . |
| 4,997,256 | 3/1991 | Sano . |
| 5,090,665 | 2/1992 | Walters . |
| 5,169,126 | 12/1992 | Reeve et al. . |
| 5,234,198 | 8/1993 | Hale et al. . |
| 5,456,450 | 10/1995 | Reeve et al. . |
| 5,533,711 | 7/1996 | Pickrell . |
| 5,645,267 | 7/1997 | Reeve et al. . |
| 5,664,765 | 9/1997 | Pickrell . |
| 5,677,974 | 10/1997 | Elms et al. . |
| 5,683,073 | 11/1997 | Pickrell . |
| 5,884,384 | 3/1999 | Griffioen . |
| 5,971,035 | 10/1999 | Griffioen . |

FOREIGN PATENT DOCUMENTS

| | | |
|---|---|---|
| 37076 | 5/1968 | (AU) . |
| 587575 | 10/1974 | (CH) . |
| 1130537 | 3/1962 | (DE) . |
| 1185312 | 1/1965 | (DE) . |
| 1209628 | 1/1966 | (DE) . |
| 1934818 | 1/1971 | (DE) . |
| 2507583 | 9/1976 | (DE) . |
| 3000109 | 9/1976 | (DE) . |
| 3045388 A1 | 2/1980 | (DE) . |
| 3340972 | 10/1985 | (DE) . |
| 3409376 | 12/1985 | (DE) . |
| 0108590 | 5/1984 | (EP) . |
| 0157610 | 10/1985 | (EP) . |
| 0 253 636 | 1/1988 | (EP) . |
| 0287225 | 10/1988 | (EP) . |
| 0318280 | 5/1989 | (EP) . |
| 0319194 | 6/1989 | (EP) . |
| 0323028 | 7/1989 | (EP) . |
| 0338856 | 10/1989 | (EP) . |
| 0 785 387 | 7/1997 | (EP) . |
| 1179521 | 5/1959 | (FR) . |
| 2577724 | 8/1986 | (FR) . |
| 747706 | 4/1956 | (GB) . |
| 817938 | 8/1959 | (GB) . |
| 1511615 | 5/1978 | (GB) . |
| 2060966 | 5/1981 | (GB) . |
| 2081764 | 1/1982 | (GB) . |
| 2086607 | 5/1982 | (GB) . |
| 2119949 | 6/1983 | (GB) . |
| 2122367 | 1/1984 | (GB) . |
| 2122370 | 8/1984 | (GB) . |
| 2157019 | 10/1985 | (GB) . |
| 2212940 | 8/1989 | (GB) . |
| 2212941 | 8/1989 | (GB) . |
| 2212942 | 8/1989 | (GB) . |
| 40-93553 | 5/1965 | (JP) . |
| 1976-15697 | 7/1974 | (JP) . |
| 1977-100994 | 1/1976 | (JP) . |
| 51-76592 | 7/1976 | (JP) . |
| 54-145181 | 11/1979 | (JP) . |
| 55-94157 | 7/1980 | (JP) . |
| 57-43005 | 9/1982 | (JP) . |
| 58-22516 | 2/1983 | (JP) . |
| 58-9359 | 4/1983 | (JP) . |
| WO 88/07693 | 10/1988 | (WO) . |

OTHER PUBLICATIONS

"Single–Ended Fiber Strain & Length Measurement on Frequency Domain", Kashyap & Reeve, Electronic Letters, vol. 16, No. 18, 8/80.

"Temperature Desensitisation of Delay in Optical Fibers for Sensor Applications" by Kashyap et al., Electronics Letters, vol. 19, No. 34, 11/83.

"A radically new approach to the installation of optical fibre using the vircous flow of air", S.A. Cassidy et al., Telecom Technol J., vol. 2, Bi, Jan. 1, 1984, 4 pages.

"Sub–ducts: The Answer to Honolulu's Growing Pains" by Herman S.L. Hu & Ronald T. Miyahara, Apr. 7, 1980, pp. 23–35.

"Optical Fibre Jacketed with Electronics Lett", Yamamoto, et al., vol. 19, No. 17, 8/83, pp. 674–675.

"High Quality Optical Fibre Cable for Telecommunication", Pizzorno, Conference 27th Int. Wire & Cable System, Cherry Hill, New Jersey, 11/78, pp. 394–403.

"Principles of Fiber–Optical Cable Design", Foord, et al., IEEE, vol. 123, No. 6, 6/76, pp. 597–602.

"Method of Introducing a Linear Body Into a Winding Tube", Asano, 9/87, No. 4468, pp. 1–4.

"International Construction Utility Equipment Exposition 1979"; External Plant News; No. 54, Apr. 1980; pp. 6–11; Note p. 8.

Plumettaz et al; "Fiber–Optic Cable Installation Method"; 1993; pp 259–271.

Griffoen et al; "Blowing Optical Cables in the Netherlands"; The Ninth Annual European Fibre Optic Communications and Local Area Network Conference, Jun. 19–21, 1991; pp. 83–86.

Griffioen; "The Installation of Conventional Fiber–Optic Cables in Conduits Using the Viscous Flow of Air"; Journal of Lightwave Technology, vol. 7, No. 2, Feb. 1989; pp 297–302.

Fee et al; A New Cable Pulling Friction Measurement Method and Results; IEEE/PES Transmission and Distribution Conference, Sep. 1991; pp 1–6.

Rifenburg; "Pipe–Line Design for Pipe–Type Feeders"; Transactions of the American Institute of Electrical Engineers; vol. 27; Dec. 1953; 1575–1288.

Griffioen; "A New Installation Method for Conventional Fiber Optic Cables in Conduits"; $37^{th}$ International Wire & Cable Symposium Proceedings; 1988; pp 172–178.

Kathiresan et al; "A Fiber–Optic Cable for Hostile Environments"; $41^{st}$ International Wire & Cable Symposium Proceedings; Nov. 16–19, 1992; pp 158–170.

Briggs et al; "The Use of the High Air–Speed Blown–Cable System for Placing Optical–Fiber Cables in Innerduct"; Post–1993; pp 179–189.

Fee et al; "Analysis and Measurement of Friction in High Speed Air Blowing Installation of Fiber Optic Cable"; National Fiber Optic Engineer Conference, Jun. 18–22, 1995; pp 502–513.

Cassidy et al; "A Radically New Approach to the Installation of Optical Fibre Using the Viscous Flow of Air"; International Wire & Cable Symposium Proceedings; 1993; pp 250–254.

Witness Statement of Josef Xavier Meier, including 5 Appendices dated Jan. 9, 1996.

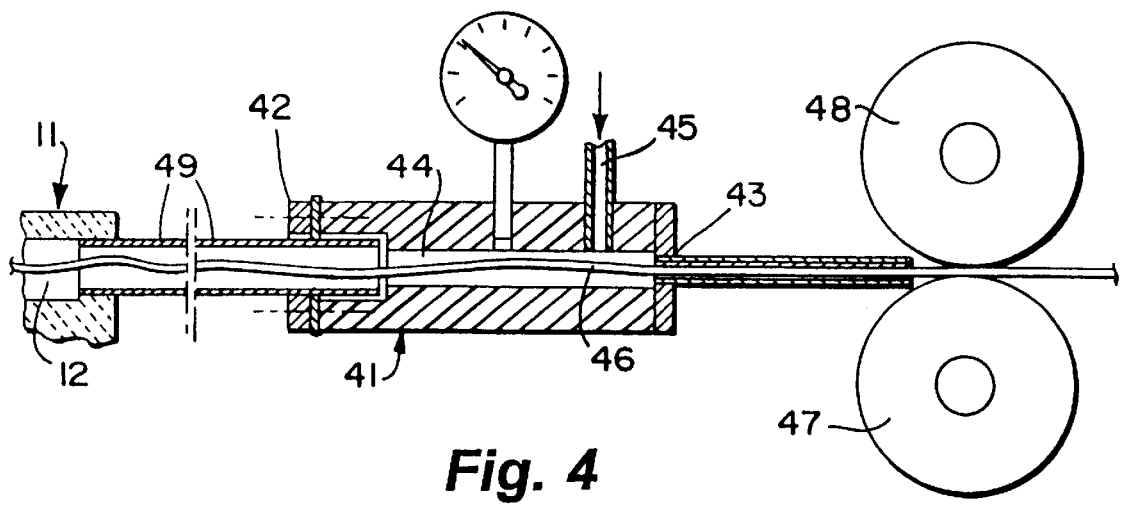
Fig. 4
Fig. 2
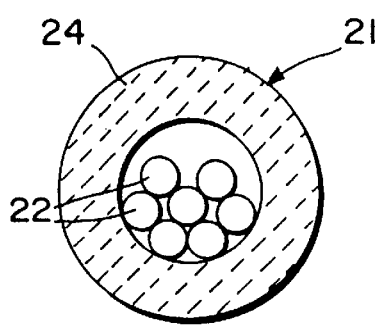
Fig. 3
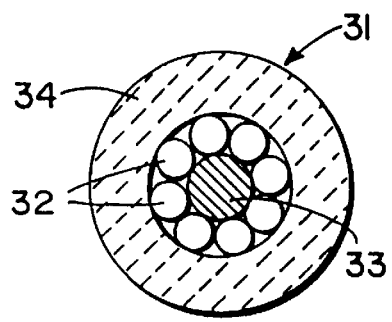
Fig. 1
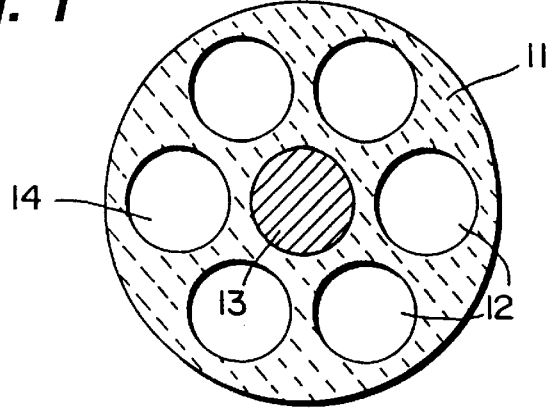

METHOD AND APPARATUS FOR INSTALLING TRANSMISSION LINES

RELATED APPLICATIONS

This is a continuation of application Ser. No. 08/852,956, filed May 8, 1997, now pending, which was a Div. of Ser. No. 08/460,268, filed Jun. 2, 1995, now U.S. Pat. No. 5,645,267; which was a Div. of Ser. No. 07/970,464, filed Nov. 2, 1992, now U.S. Pat. No. 5,456,450; which was a Div. of Ser. No. 07/554,927 filed Jul. 20, 1990, now U.S. Pat. No. 5,169,126; which was a Cont. of Ser. No. 07/086,849, filed Aug. 19, 1987, now U.S. Pat. No. 4,948,097 and a CIP of Ser. No. 06/848,950, filed Apr. 7, 1986, now U.S. Pat. No. 4,691,896; which as a Cont. of Ser. No. 06/551,640, filed Nov. 8, 1983, now abandoned, the entire contents of each of which is hereby incorporated by reference in this application.

FIELD OF THE INVENTION

This invention generally relates to optical fibre and other lightweight and flexible transmission lines. More particularly, the invention relates to a method and apparatus for installing such communications media.

BACKGROUND OF THE INVENTION

Optical fibre cables carrying optical fibre transmission lines have heretofore been installed by the same methods as conventional metal conductor cables. Such methods usually involve pulling the cable with a pulling rope through a previously laid cable duct. Frequently the cable duct already contains one or more conventional cables at the time of installing the optical fibre cable.

Unlike the metal conductors of a conventional cable, the optical fibres are easily damaged by tensile stress. Such stress may, for example, propagate micro-cracks, leading to fibre breakage in the long term. It is, therefore, standard practice to reinforce optical fibre cables by providing a central strength member, usually one or more steel tension wires, about which the optical fibres are disposed. The strength member takes up, and thus increases the ability of the cable to withstand, tensile stresses accompanying installation of the cable.

Unfortunately, the central strength member usually provides insufficient protection against local stresses caused by pulling a further cable through the same duct. The conventional approach of installing at the outset optical fibre cables containing sufficiently large numbers of optical fibres to satisfy foreseeable future traffic demands is a way of overcoming this problem. In consequence, first time installation of optical fibre cables containing dozens or even hundreds of optical fibres are currently envisaged despite the fact that to begin with a small fraction of the installed fibres would provide ample traffic carrying capacity. A further reason for installing optical fibre cables of comparatively large dimension is that the smaller the cross section of the cable the more prone the cable becomes to wedging in between those cables already present in the duct.

The first time installation of large diameter optical fibre cables with high numbers of optical fibres, is, however, undesirable for a variety of reasons. Firstly, there are problems of a technical nature inherent in such cables, such as, for example, the difficulty of forming joints and of achieving the required high strength-to-weight ratios. Secondly, there are clear economical drawbacks in committing large resources to install initially unused fibre capacity, particularly in view of the comparatively recent origins of optical fibre technology which lead one to expect continued substantial reductions in the price and improvement in the quality of optical fibres. Thirdly, there is the serious risk of damaging in a single incident very large numbers of expensive optical fibres. Finally, there is an appreciable loss in flexibility when routing high density optical fibre transmission lines.

A method of installing optical fibres with pulling ropes and pull chords is described in "Sub-ducts: The Answer to Honolulu's Growing Pains", Herman S L Hu and Ronald T. Miyahara, Telephony, 7 April 1980, pp 23 to 35. The installation method described there proceeds as follows: a section of existing 4-inch (100 mm) duct is rodded and thereafter between one and three individual 1-inch (25 mm) polyethylene tubes are inserted into the duct using pulling ropes. The polyethylene tubes form subducts into which an optical fibre cable can be pulled with the aid of a nylon pull chord which has previously been inserted into the subduct by means of a parachute attached to its leading end and pushed through the subduct with compressed air.

The method just referred to does deal with some of the problems discussed above, but only to a very limited extend. Thus, it enables fibre capacity to be increased in up to three stages, and separates the optical fibre cables from those cables already in the duct, thereby greatly reducing the likelihood of jamming, and hence overstressing, of the optical fibre cable.

OBJECTS AND SUMMARY OF THE INVENTION

It is an object of the present invention to overcome, or at least appreciably mitigate the majority of the aforementioned problems of installing optical fibre transmission lines.

It is another object to provide a method of installing optical fibre transmission lines which is comparatively simple and yet flexible and economical. Moreover, it is an object of the present invention to utilize this same method to install other lightweight and flexible wire transmission lines as well. The transmission lines may comprise one or more of the following, in any combination: optical fibres, wires or other electrical conducting media, other dielectric transmission media, or any other medium capable of carrying data. The only other requirement is that the transmission medium should be sufficiently lightweight and flexible for installation by the method of the invention. The term "transmission line" as used hereinafter in this specification and claims shall be construed to mean transmission lines as defined above.

According to the present invention, a method of advancing a lightweight and flexible transmission line along a tubular pathway comprises inserting the free end of such a line into a previously installed pathway, and propelling the line along the pathway by fluid drag of a gaseous medium passed through the pathway in the desired direction of advance.

It will be appreciated that to generate sufficient fluid drag to propel the transmission line, the gaseous medium has to be passed through the pathway with a flow velocity much higher than the desired rate of advance.

The terms "lightweight and flexible" with respect to the transmission line are to be understood as meaning "sufficiently lightweight and flexible" for the transmission line to be propelled by the fluid drag.

Whether the transmission line is sufficiently lightweight and flexible and the flow velocity sufficiently high is readily determinable by a simple trial and error experiment, guided, if necessary, by the theoretical model discussed below.

The flow velocity of the gaseous medium may be steady or may be suitably varied, for example either between a first velocity producing no, or insufficient, fluid drag to propel the fibre or wire member, and a second velocity producing sufficient fluid drag to propel the fibre or wire member, or between a first and second velocity both producing sufficient fluid drag for propelling the fibre or wire member. Conveniently the variations in velocity take the form of repeated abrupt changes between the first and second velocity.

The aforementioned variations in flow velocity may include periods during which the flow is reversed with respect to the desired direction of advance of the transmission line.

It is to be understood that more than one transmission line may be propelled along the same tubular pathway.

A transmission line may, for example, comprise a single optical fibre or wire, protected by at least a primary coating but preferably contained within an outer envelope. Alternatively, a fibre or wire member may comprise a plurality of optical fibres or wires contained within a common envelope. The envelope may loosely or tightly surround the fibre (wire), or fibres (wires).

The method may be used for insertion of an optical fibre or wire member into, or its withdrawal from, the pathway.

The gaseous medium is chosen to be compatible with the environment in which the invention is performed, and in ordinary environments will be a non-hazardous gas or gas mixture. With the proviso about compatibility with the environment, the gaseous medium is preferably air or nitrogen.

The tubular pathways and/or the fibre or wire members are conveniently but not necessarily of circular cross-section, and the fibre or wire member is always smaller than the pathway.

In practice, when installing an optical fibre member, the pathway internal diameter will generally be greater, and frequently much greater than 1 mm, and the external diameter of the fibre member greater than 0.5 mm.

A preferred range of diameters for the pathway is 1 to 10 mm, conveniently between 3 and 7 mm, and a preferred range of diameters for the fibre members is 1 to 4 mm, although much larger diameters may be used provided the fibre member is sufficiently lightweight and flexible. The diameter of the fibre members is preferably chosen to be greater than one tenth, and conveniently to be about one half of the pathway diameter or greater (and appropriately less, of course, if more than one fibre member is to be propelled through the same pathway).

Insertion of a fibre (or wire) member by means of the fluid drag of a gas passing over the fibre member has several advantages over methods involving pulling an optical fibre (wire) cable with a pull cord.

Firstly, the extra step of providing a pull cord is eliminated.

Secondly, using the fluid drag of a gaseous medium produces a distributed pulling force on the fibre (wire) member. This is particularly advantageous if the installation route contains one or more bends. If, as would be the case with a pulling cord, the pulling force were concentrated at the leading end of the fibre member, any deviation of the pathway from a straight line would greatly increase friction between the fibre member and the internal walls of the pathway, and only a few bends would be sufficient to cause locking of the fibre. The distributed pulling force produced by the fluid drag, on the other hand, enables bends to be negotiated fairly easily, and the number of bends in a given installation is no longer of much significance.

Thirdly, the fluid drag substantially reduces overall pulling stress on the fibre (or wire) member and so permits the fibre (or wire) member to be of relatively simple and cheap construction.

Furthermore, because the fibre member is not subjected to any substantial pulling stress during installation, little allowance, if any, needs to be made for subsequent relaxation.

According to a further aspect of the present invention, a method of installing a transmission line comprises installing a conduit having one or more ductlets providing tubular pathways. The communications route may be initially designed and upgraded according to a customer's needs or desires. For example, after installation of the conduit, wire members containing one or more lightweight and flexible wires initially may be propelled through a pathway using fluid drag. Thereafter, the route may be upgraded by installing further wire members and/or inserting, by the aforesaid method using fluid drag, one or more fibre members into the associated ductlets as required.

Installing optical fibre and/or wire transmission lines by this method has several advantages over conventional techniques.

First, since the conduit is installed without containing any optical fibres, conventional rope pulling and similar techniques may be freely employed for installing the conduit.

Second, the capacity can readily be adapted to requirements. Thus, while initially only one or two fibre or wire members may be sufficient to carry the traffic, the conduit may contain a much larger number of ductlets than are required at the time of installation, and further fibre members may be inserted later on as and when needed. The conduit of the present invention is cheap compared to the cost of the fibres, and spare ductlets to accommodate further fibres and/or wires as and when extra capacity is required can thus be readily incorporated without adding more than a small fraction to overall costs.

The method of the present invention also permits the installation of improved later generations of transmission lines. It is possible, for example, to install at first one or more fibre members incorporating multimode fibres, and at a later date add, or replace the installed multimode fibre members with fibre members incorporating monomode fibres. Installed fibre members may conveniently be withdrawn from the ductlet, and replacement fibre members be inserted by using the aforesaid method of propelling by fluid drag of a gaseous medium.

According to yet another aspect of the present invention, an optical fibre cable comprises a conduit including one or more ductlets forming tubular pathways and capable of loosely accommodating an optical fibre member, and at least one optical fibre member inserted by the aforementioned method using fluid drag. The conduit may be rigid or flexible.

Where the conduit includes more than one ductlet, the ductlets are conveniently formed by bores in the material of the conduit. The term "bore", like the word "tubular" is understood in this context to include circular and other suitable shapes of cross-sectional area.

Alternatively, the conduit may comprise a plurality of individual tubes enveloped by a common outer sheath.

It will be appreciated that the present invention largely avoids the risk, inherent in handling optical fibre cables with a large number of fibres, of accidentally damaging before or during installation in a single event a large number of expensive optical fibres.

The present invention also enables the installation of continuous optical fibres over several installation lengths without joints.

Furthermore, individual fibre members routed through the conduit can be routed, without requiring fibre joints, into different branch conduits at junction points.

BRIEF DESCRIPTION OF THE DRAWINGS

The present invention will now be explained further by way of example and with reference to the accompanying drawings of which:

FIG. 1 is a cross section through a conduit suitable for implementing the invention;

FIGS. 2 and 3 are relatively enlarged cross sections through fibre members;

FIG. 4 is a schematic diagram of apparatus for inserting fibre members into ductlets by fluid drag;

DETAILED DESCRIPTION OF THE INVENTION

Figure 5:
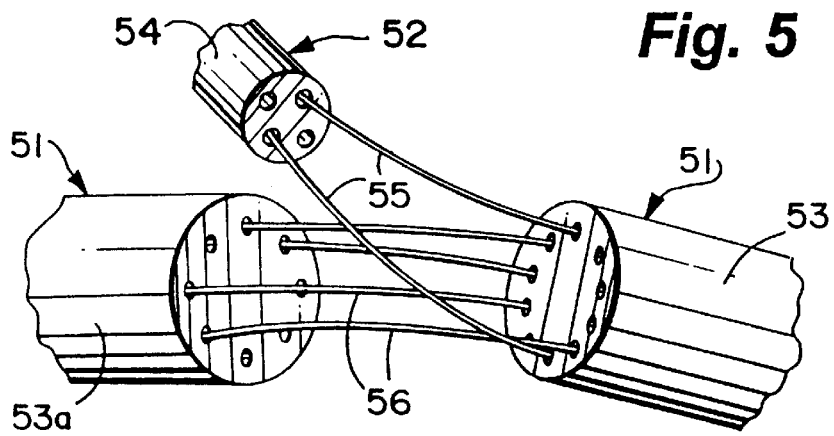
FIG. 5 is a schematic drawing of a junction between a trunk and a branch conduit.

Referring first to FIG. 1, there is shown a conduit 11 incorporating six ductlets 12, one of which contains a transmission line in the form of a fibre or wire member 14, and a core 13.

The conduit 11 is made of extruded polymer or other suitable material, the ductlets, or bores, 12 being formed in the conduit during its extrusion. The central core 13 contains copper wire pairs required for testing operations during and after installation, repeater supervision, power supply, and the like. Alternatively, or additionally, the core 13 may incorporate reinforcements, for example tension wires, to take up the tension forces during installation of the conduit. Where required, the conduit may be surrounded by a water barrier (not shown).

The copper wire pair for testing can be omitted from the core 13 if suitable alternative testing facilities are available, such as, for example, testing methods using optical fibre or wire members inserted subsequently into the conduit as described below.

FIG. 2 is a cross-section through a fibre or wire member 21 which is in a form particularly suited for installation by fluid drag. For example, the member 21 may comprise several optical fibres 22 lying loosely in a polymer sheath 24. In view of the virtual absence of any pulling stress during installation of a fibre member by fluid drag, the fibre member 21 does not require reinforcement. The relatively simple construction also leads to lower production costs, as well as making the fibre member 21 comparatively light, thereby enabling easy installation by fluid drag.

In certain circumstances it may be desirable to provide a reinforced fibre member, and FIG. 3 is a cross-section through such a fibre member 31 which, provided it is made light enough and flexible enough, is suitable for insertion by fluid drag into a ductlet 12 of the conduit 11 in FIG. 1. The fibre member 31 consists of a plurality of optical fibres 32 arranged around a strength member 33 and enclosed in a polymer sheath 34.

A wire bundle may be formed in a similar manner. For example, two seven-strand copper wires may be encased in a foamed coating. The completed unit typically would have a resistance of around 108 ohm/km. Such a unit may be installed in a duct by the drag method described below.

The installation of an optical and/or wire transmission line proceeds as follows:

The flexible conduit 11 is installed into an existing duct (not shown) by conventional methods such as pulling with a pulling rope.

Because the conduit 11 does not contain any optical fibres at this stage, the conduit 11 can be handled in the same way as an ordinary cable, and no special care needs to be taken over and above that customary in installing conventional metal conductor cables. If required, it is also possible at this stage, that is before the conduit contains any optical fibres, to pull a further conduit through the duct to provide spare capacity.

Furthermore, since the conduit can readily be made of an external diameter matching that of cables already in the duct, wedging is less likely to occur than with a standard, smaller diameter optical fibre cable.

Depending upon the needs of a particular customer, the communications route may be, for example, initially comprised of conventional copper cables, installed by conventional (e.g., pulling) techniques or alternatively one or more wires encased in bundles (such as shown in FIG. 2 or 3), which have been propelled through the conduit using the fluid drag technique described in detail below. At a later point in time, the communications route may be upgraded by using the blowing technique to install in any desired combination copper wire and/or fibre bundles.

For example, a telecommunications route to a customer, or a network in an existing building may be upgraded by installing a new copper pair by the fluid drag technique. At any desired point in time the route may be further upgraded by installing fibre optic members in, for example, different ductlets then those housing the wire members.

It should be recognized that while the description which follows will focus on propelling optical fibre members through a previously installed tubular pathway, the same mathematical analysis and scientific principles apply to propelling other lightweight and flexible transmission lines such as wire or wire bundles through such a pathway.

Turning back to FIGS. 2 and 3, once a conduit is installed, optical fibre members such as 21 and 31 are inserted into as many of the ductlets 12 as is required. Instead of the afore-described fibre members 21 and 31 of near circular cross-section, the fibre members may, for example, be so-called ribbons, in which a thin, wide sheath encloses an optical fibre or a plurality of optical fibres lying in the same plane.

Manufacture of the conduit 11 is cheap compared to the optical fibres in the fibre members 21 or 31 which it is designed to carry, and spare ductlets 12 for future expansion can readily be incorporated at the extrusion stage of the conduit 11 without adding unduly to the overall cost. The conduit may be manufactured by adapting conventional cable manufacturing processes such as, for example, extrusion.

A gas flowing past the surface of a solid object produces a drag force which largely depends on the velocity of the gas relative to the surface. The applicants have found that this drag force can be made sufficiently large to pull a lightweight optical fibre (or wire) member 21, or 31 into a tubular pathway such as, for example, a ductlet 12 of the aforementioned conduit 11.

In experiments, the flow velocity, or the flow rate, of air through a given pathway has been found to depend approximately linearly on the pressure difference between opposite ends of the pathway, with the slope of the dependency indicating that flow at useful flow rates is predominantly turbulent.

For a given pressure difference, the flow rate varies with the size of the free cross sectional area of the bore, while the drag force on a fibre member present in a bore varies with the flow rate and the surface area of the fibre member. By selecting a lightweight member having a relatively large surface area, the member may be propelled by the drag force over an extensive distance. The drag force has been optimized in experiments by varying these parameters and, in particular, by choosing an appropriate ratio of bore diameter to fibre member diameter.

Experiments have been performed using a bore diameter of 7 mm. The optimum fibre member diameter for this bore size has been found to lie between 2.5 and 4 mm. A pressure below 80 p.s.i. (approximately 5.6 kgs/cm$^2$), usually about 40 p.s.i. has been found sufficient to insert fibre members of up to 3.5 gram per meter (gr/m) over lengths of 200 meters. A fibre member of 2 gr/m is easily installed over this length.

The theoretical value for the drag forces for these dimensions has been calculated in the manner described below with reference to FIG. 6 to be 2.5 gr/m. Lower practical values are believed to be due to the tendency of the fibre members 21, 31 to acquire "set" while on the supply reel. This set would appear to force the fibre member 21, 31 against the wall of the bore 12, thereby increasing friction. Suitable texturing or shaping of the fibre member surface may lead to drag forces higher than those presently experienced.

It should be noted here that using fluid drag to insert fibre members into tubular pathways differs significantly from the method described in the above mentioned article of inserting pull cords by means of parachutes. The parachute is propelled by the pressure difference between the air in front of and the air behind the parachute, and the velocity of the air relative to the advancing cord is only minimal and the pulling force is localized at the point of attachment of the parachute. In contrast, using fluid drag requires a much higher flow velocity of fluid than the speed of advancement of the fibre members.

Also, unlike the use of parachutes or potential other methods of inserting fibre members into the tubular pathways, using fluid drag produces a uniformly distributed pulling force on the fibre member. This reduces the strain on the optical fibres within the fibre member to very low values.

In ordinarily pulling a fibre member through a bend enclosing an angle θ, the tension of the leading end, $T_2$ is related to the tension $T_1$ at the trailing end $T_2/T_1 = e^{\mu \theta}$, where $\mu$ is the coefficient of friction. Even a small number of bends in the pathway may therefore result in an unacceptably high force being required at the leading end if locking of the fibre member is to be avoided. In contrast, the distributed pulling force produced by fluid drag is applied evenly along the fibre member, including in bends, and permits a large number of bends to be easily and speedily negotiated without any undue stress on the fibre member.

FIG. 4 illustrates apparatus for feeding fibre (or wire) members into tubular pathways such as the ductlets 12 of the conduit 11 of FIG. 1. The apparatus consists of a feedhead 41 which contains a straight bore 44 connected at one end, its outlet end 42, to a flexible tube 49, and at the other end, its inlet end 43, to a supply reel (not shown). The head 41 also contains an inlet 45 for air. The outlet end 42 and the bore 44 are substantially larger in cross sectional area than fibre member 46. The aperture of the inlet end 43 is only slightly larger in cross sectional area than that of the fibre member 46. This arrangement forms an air block which presents a relatively large flow resistance to air and helps prevent air escaping through the inlet duct 43. The tube 49 is inserted into one of the ductlets of the conduit 11. Suitable seals between the feedhead 41 and the tube 49, and the ductlet 12 prevent undesirable escape of the air.

In use the fibre member 46 is fed into the inlet end 43 of the feedhead 41 by means of a pair of rubber drive wheels 47 and 48, driven by a constant torque driving mechanism (not shown). As will be explained further below, the insertion force provided by the driving mechanism is an important element in this embodiment of the present invention since a free end of the fibre (or wire) member must be introduced in the tubular pathway from an area at atmospheric pressure into a high pressure region, so there is a steep positive pressure gradient resisting entry.

As shown in FIG. 4, air is fed into the bore 44 through the air inlet 45 and hence is directed through the tube 49 into the ductlet 12. The optical fibre member 46 is pushed through the inlet end 43 of the feedhead into the bore 44 and onwards into the tube 59. Pushing of the fibre member 46 continues until the surface area of the fibre member which is exposed to the air flow is sufficiently large to produce a drag force to cause the further advance of the fibre member 46 through the tube 49 and the ductlet 12, while the rate of feed is controlled by means of the aforementioned rubber drive wheels 47 and 48.

FIG. 5 shows a branching connection between an optical fibre trunk line 51 and a branch line 52, each comprising a conduit 53 and 54 respectively and one or more fibre members 55 and 56. Since, as described above, the fibre members are individually introduced into the ductlets of the trunkline conduit 53, individual fibre members 55 can be routed from the trunk conduit 53 into the branch conduit 54 as required, while other fibre members 56 continue to the adjacent section 53a of the trunkline conduit.

Figure 6:
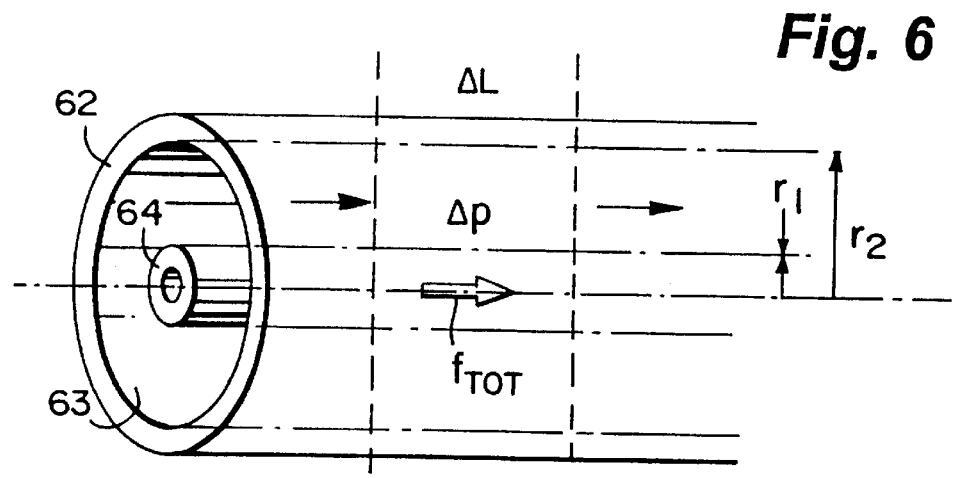
FIG. 6 is a schematic diagram to illustrate the notation used in drag force calculations.

Referring now also to FIG. 6, the drag force on the fibre member 64 within the bore 63 of a ductlet, or tube, 62 on account of turbulent air flow through the bore 63 can be calculated as discussed below.

These calculations show that what has been called fluid drag or drag force above is, in fact, a composite force, of which the major proportion is normally due to viscous drag, and at least one other important component due to a hydrostatic force, f' as discussed below. It will be appreciated that the exact composition of the drag force does not affect the principles of the invention but the more detailed analysis below can be used to optimize the parameters involved in carrying out the invention, and to obtain some guidance for trial and error experiments.

The pressure difference between the tube ends can be equated to a shear force distributed over the inner surface of the bore 63 and the outer surface of the fibre member 64. Thus, one has, for a small element of length Δl producing a pressure drop Δp $$\Delta p \pi (r_2^2 - r_1^2) = F \quad (1)$$

where $r_2$=outer tube bore radius, $r_1$=inner tube radius and F is the viscous drag force on the inner and outer walls of the elemental length.

If it is now assumed that the force F is distributed evenly over the area of the inner and outer walls, that is to say the external wall of the fibre member and the internal wall of the ductlet respectively, the drag force, f, on the fibre member per unit length is:

$$f = \frac{F}{\Delta l}\left[\frac{2\pi r_1}{2\pi(r_1 + r_2)}\right] = \frac{\Delta p}{\Delta L}\pi r_1(r_2 - r_1) \quad (2)$$

which gives, in the limit, the drag force on the fibre member per unit length, $$f = \pi r_1(r_2 - r_1)\frac{dp}{dl} \quad (3)$$

In addition, we must consider the hydrostatic force produced by the pressure difference acting on the cross-sectional area of the fibre member. This is locally proportional to the pressure gradient and therefore is distributed over the installed length of the fibre member in the same way as the viscous drag force, leading to an additional force $$f' = \frac{dp}{dl}\pi r_1^2 \quad (4)$$

giving a total force per unit length of $$f_{TOT} = \frac{dp}{dl}\pi r_1 r_2 \quad (5)$$

Figure 8:
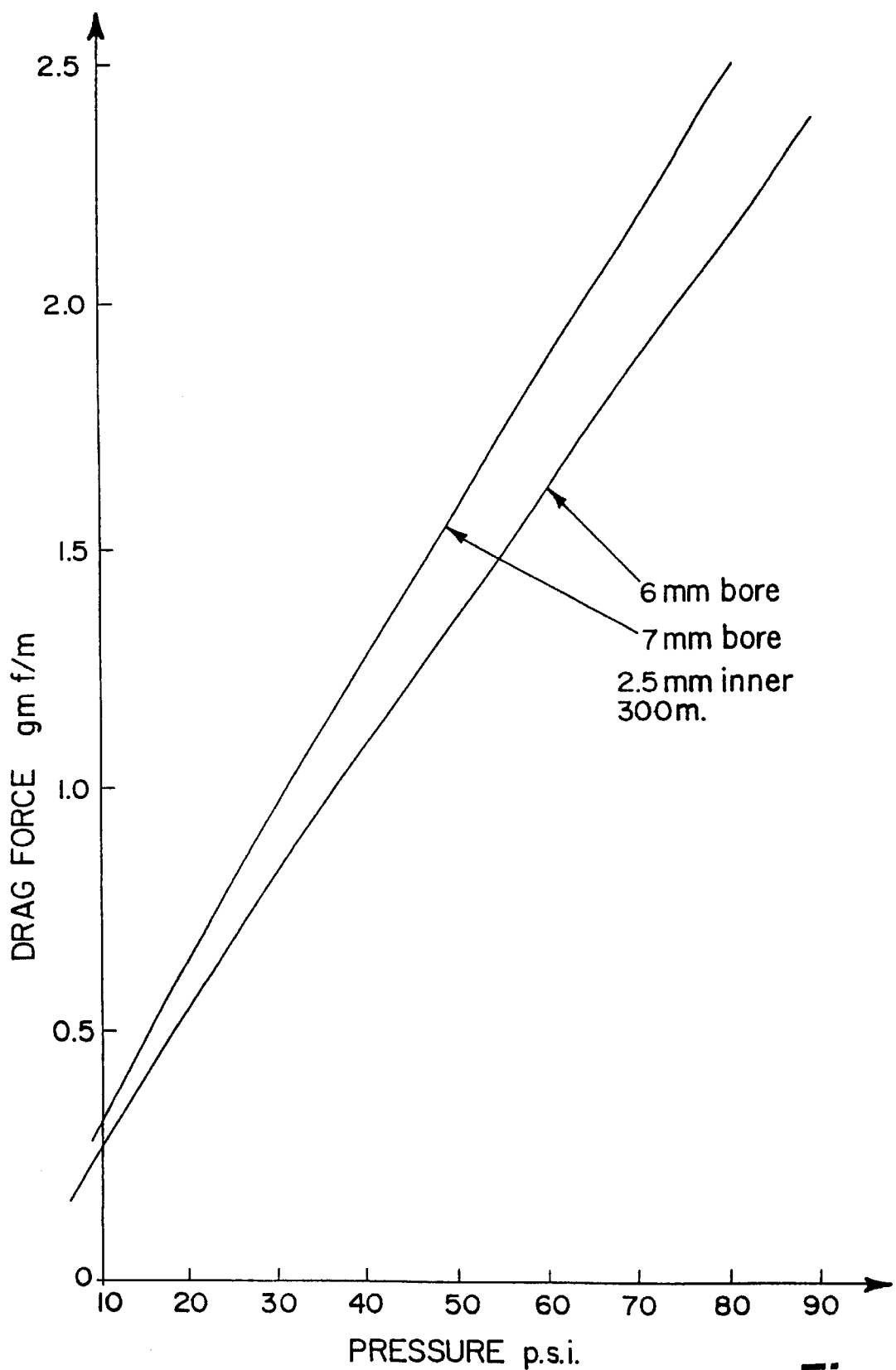
FIG. 8 is a graph of drag force vs pressure.
Figure 9:
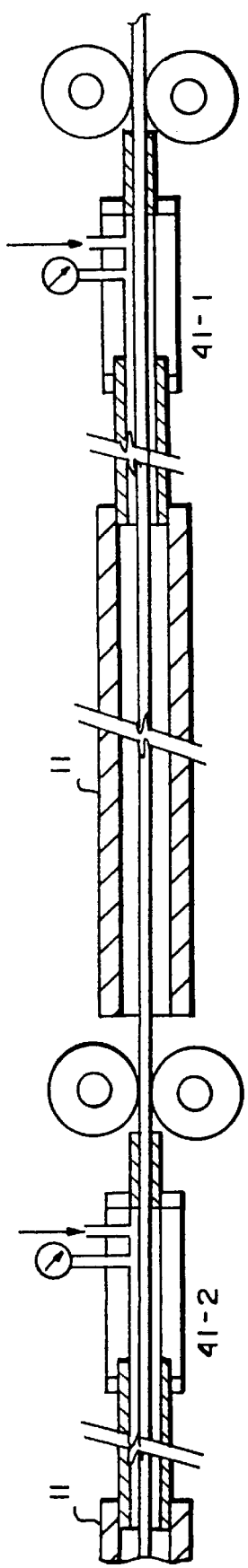
FIG. 9 is a schematic diagram of apparatus for inserting fibre members into ductlets by fluid drag using two apparatuses.

In order to get an initial estimate of this it is assumed that the pressure drops linearly over the length of the bore, whether filled by the fibre member or not. Equation 5 is then plotted, for the case of the 6 mm bore diameter with 2.5 mm O.D. fibre member, in FIG. 8, for a length of 300 m. Since pressure is normally quoted in psi it has been retained here for the sake of convenience.

Coefficients of friction of around 0.5 have been measured for the polyethylene and polypropylene fibre members against a polyethylene and polypropylene fibre members against a polyethylene bore wall. Therefore, with a fibre member weighing 3 gms/m we could expect to install a 300 m length with around 55 psi pressure. Any extra drag force over that required to overcome friction would appear at the start end as a gradually increasing tension in the fibre member as installation proceeds.

Figure 7:
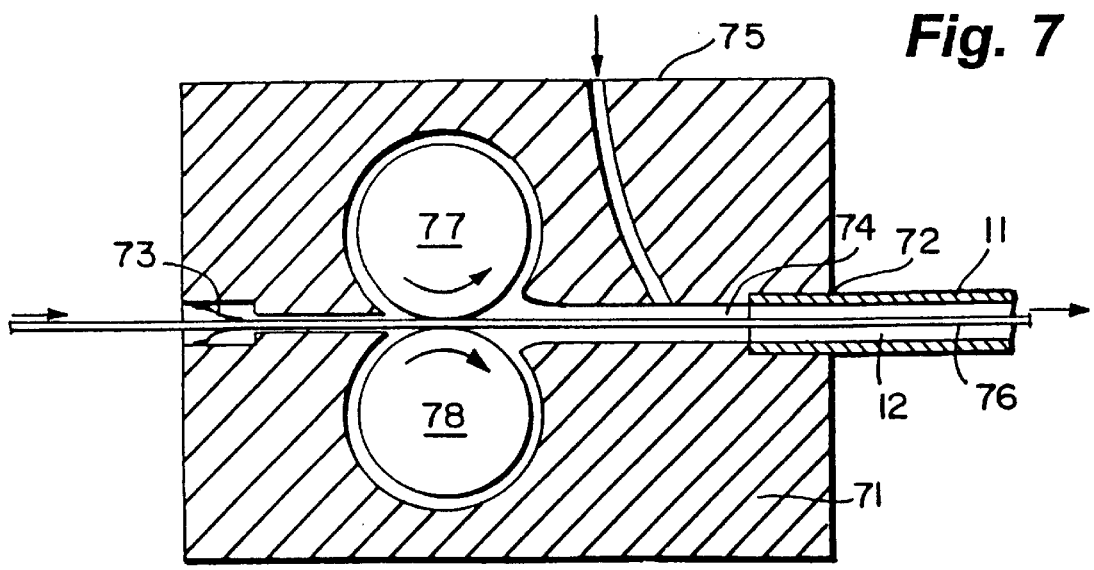
FIG. 7 is a schematic section of a modified drive unit.

FIG. 7 shows in diagrammatic form the arrangement of the modified drive unit discussed with reference to FIG. 4, in which the only major change lies in incorporating the drive wheels 77 and 78 within the feedhead 71.

As the foregoing discussion with reference to FIG. 6 has illustrated, the viscous drag force is accompanied by a hydrostatic force, the force f' of equation 5 above. This force f' has been found to oppose the insertion of the fibre member into the drive unit, making the incorporation of the drive wheels 77 and 78 into the drive unit preferable. The force f', referred to above as the hydrostatic potential must be overcome when introducing the fibre member into the pressurized areas. The drive wheels would be driven by a torque just sufficient to overcome this potential.

Focusing on the insertion force necessary to overcome the hydrostatic potential, this force may be viewed as being that force necessary to overcome the pressure acting on the free end of the fibre (or wire) member. It will thus decrease as the unit is installed and the free end proceeds to regions of lower pressure. It is therefore possible to reduce the insertion force as installation proceeds. In fact, the particular point along a communications route at which the insertion force may be completely removed may be calculated as follows.

In the event the installation force (viscous drag) just matches the force necessary to move the unit through the duct against friction (the product of the weight of the unit and the coefficient of friction) then the insertion force must be maintained to balance the end force (hydrostatic force).

However, if the viscous drag forces are such as to exceed the frictional forces then the excess can serve to overcome the end force, thus obviating the need for the insertion force.

This is most likely to be the case for a completely straight route, whereby excess drag force can be completely fed back to the blowing head, and is not lost by tightening into bends.

In this circumstance the force F on the end of the unit is $$F = (p - p_2)\pi r_1^2$$

$$\text{Excess drag} = \left[\frac{p_1 - p_2}{L}\pi r_1 r_2\right]l - wl\mu$$

where:
L=the length of the tube in which the fibre is to be installed
f=force on fibre unit at a position l from the start of the duct
$r_1$=inner tube external radius (See FIG. 6)
$r_2$=outer tube bore radius (See FIG. 6)
p=the static pressure a distance from the blowing head
$p_1$=the supply pressure
$p_2$=atmospheric pressure
$\omega$=weight/unit length
$\mu$=coefficient of friction
When these are equal the insertion force can be removed.

$$\text{i.e., } \left[\frac{p_1 - p_2}{L}\pi r_1 r_2\right]l - wl\mu = (p - p_2)\pi r_1^2$$

Assuming linear pressure gradient $$\text{then } p - p_2 = \frac{(p_1 - p_2)}{L}(L - l)$$

$$\therefore \left[\frac{p_1 - p_2}{L}\pi r_1 r_2\right]l - wl\mu = \frac{p_1 - p_2}{L}(L - l)\pi r_1^2$$

For a typical case of
L=500 m
$P_1-P_2$=150 psi
$r_1$=1 mm
$r_2$=3 mm
$\omega$=2 gm/m $\mu$=0.5
Then l=200 m. It is therefore possible, in this example, to completely remove the insertion force provided, for example, by the drive wheels after roughly half the fibre member has been installed. Thus, when the fibre member reaches the 200 m point of such a pathway (or shortly thereafter), a control/switching means may be used to simply de-energize the drive wheels and move them out of contact with the fibre member in a manner well understood by those skilled in the art. It should also be recognized that, since the hydrostatic force decreases as the free end of the fibre proceeds to regions of lower pressure (as indicated by the above mathematical analysis), more sophisticated electronic control over the insertion force producing drive wheels may be exercised, e.g., by varying the drive wheel motor speed.

As shown in FIG. 7, the drive wheels 77, 78 are incorporated into the pressurized cavity 74 and thus the force on the fibre member necessary to overcome the hydrostatic potential is tensile. If the wheels were outside the drive unit, this force would be compressive, and there would be tendency for the fibre member to buckle. As will be recognized by those skilled in the art, upon the occurrence of such a buckle (due, for example, to an excessive insertion force), the insertion force would need to be briefly interrupted until the buckle disappears. Thus, even before the point along the communications route is reached where the insertion force may be completely removed, there are circumstances which may require the insertion force to rise or fall during installation.

For convenience, the drive unit may be made to split along the fibre member axis, and perpendicular to the diagram, or in some other plane. The air seals, 72, 73 may be, for example, rubber lips, or narrow channels.

In operation, a fibre member 76 fed into the drive unit would be automatically taken up by the drive wheels with just enough force to overcome the hydrostatic potential, and fed on along the ductlet 12. The fluid drag of the air flowing down the ductlet 12 causes the fibre member 76 to be pulled along the ductlet 12 as the installation proceeds. This means that such a drive unit can be placed between two adjoining sections of conduit so that a fibre member emerging from a ductlet in the first conduit can be fed into the appropriate ductlet of the second. Thus, an installation could consist of a fibre member 76 running through a number of conduits using two or more drive units in tandem, possibly without supervision.

It will be appreciated that it is possible to blow compounds in liquid or powder form along the ductlet prior to, or during installation in order to provide lubrication for the fibre members. Powdered talc is an example of a suitable lubricant.

The ductlets may, for example, also be formed in a power cable, or in a conventional subscriber line, to allow subsequent installation of optical fibre members. In the latter case, to avoid ingress of water, the ductlet may be sealed until the time of installation of the fibre members. It will be appreciated that the embodiments of apparatus for introducing a transmission line as shown in FIGS. 4 and 7 are exemplary only. Other means of introduction may be provided instead, and in such circumstances it is possible that there will be no positive pressure gradient (i.e., hydrostatic force), and thus no specific insertion force would be necessary.

While the invention has been described in connection with what is presently considered to be the most practical and preferred embodiment, it is to be understood that the invention is not to be limited to the disclosed embodiment, but on the contrary, is intended to cover various modifications and equivalent arrangements included within the spirit and scope of the appended claims.

What is claimed is:

1. A method of advancing an elongate, flexible tubular element along a previously installed duct, said method comprising:
   a) inserting the free end of an elongate, flexible tubular element into the previously installed duct by applying to the tubular member a force in the direction of insertion;
   b) inserting a gaseous medium into the pathway with a flow velocity much higher than the desired rate of advance of the tubular element along the duct; and
   c) propelling the free end and following portions of the tubular element along the duct by continuance of said insertion force in cooperation with the fluid drag of the gaseous medium passed along the length of the duct in the desired direction of advance, said gaseous medium having substantially higher velocity than said tubular element throughout the length of the duct.

2. A method as claimed in claim 1 using ducts and tubular elements of circular cross-section.

3. A method as claimed in claim 2 using tubular elements of a diameter greater than one tenth of the diameter of the duct.

4. A method as claimed in claim 1 wherein the gaseous medium is compressed air.

5. A method as claimed in claim 1 wherein the gaseous medium is nitrogen.

6. A method as in claim 1 wherein: an insertion force is applied to an advancing section of the tubular element situated at or near an area of positive pressure gradient in the vicinity of said first end, said force being directed towards said second end, and said propelling step includes the application of sufficient said insertion force to overcome hydrostatic pressure forces in the gaseous medium resisting insertion of the free end into said pathway.

7. A method of installing an elongate tubular element into a previously installed duct, comprising:
   a) inserting the free end of an elongate tubular element into the duct in situ by applying to said tubular element a force in the direction of insertion;
   b) injecting a gaseous medium into the pathway; and
   c) propelling the free end and following portions of the tubular element throughout the duct by continuance of said insertion force in cooperation with viscous fluid drag of said gaseous medium passed through the duct in a predominantly turbulent flow of said gaseous medium in the direction of insertion of the tubular element and distributing the pulling force throughout the ever increasing length of the tubular element situated within the duct without concentrating an unacceptable pulling force on any portion of the tubular element, said flow of gaseous medium having a substantially higher velocity than said tubular element throughout the length of the duct.

8. A method as claimed in claim 7, wherein the gaseous medium is passed through the duct at a steady average flow velocity.

9. A method as claimed in claim 7 wherein the gaseous medium passed through the duct at a flow velocity which is repeatedly changed abruptly between a first and second average velocity, at least one of which velocity is sufficiently high to produce predominantly turbulent flow.

10. A method of advancing an elongate, flexible tubular element along a previously installed tubular pathway in situ, said tubular pathway extending between two points, said method comprising the steps of: inserting and advancing a free end of said tubular element into one end of said pathway be applying to said tubular element a force in the direction of insertion; flowing a gaseous medium throughout the entire length of the pathway in the direction of tubular element advancement, said gaseous medium flowing at a high relative velocity with respect to said fibre member; propelling the free end and the following portions of the tubular element along the pathway by continuance of said insertion force in turbulent gaseous flow and viscous drag forces which are exerted upon said tubular element and which are distributed along the length of the tubular element then installed within the tubular pathway such that an unacceptable pulling force is not concentrated on any portion of the tubular element, such as at said one free end of said tubular element; and continuing said flowing step until said tubular element is installed throughout the entire length of said passageway.

11. A method as claimed in claim 10 further comprising the step of flowing a lubricant through said pathway prior to said advancing step.

12. A method as claimed in claim 10 wherein said tubular pathway has a maximum internal diameter which is less than 10 times the maximum external diameter of said tubular element.

13. A method as claimed in claim 12 wherein said tubular pathway has a maximum diameter which is approximately twice the maximum diameter of said tubular element.

14. A method as claimed in claim 10 wherein said tubular element has a predetermined weight per unit length and a pre-determined co-efficient of friction when In contact with internal walls of said tubular passageway and wherein said flowing step is performed by maintaining a pressure differential between two ends of said pathway sufficiently high to generate said viscous drag forces at a magnitude in excess of the friction of forces between contacting lengths of the tubular element and the tubular passageway.

15. A method as claimed in claim 10 used to install said tubular element serially through a plurality of tubular pathways wherein said advancing step is performed in seriatim at the entrance to each of the tubular pathways and said flowing step is performed simultaneously in each pathway having a length of said tubular element here within.

16. A method of installing an elongate tubular element into and along a length of previously installed tubular pathway between first and second ends of the pathway, said method comprising the steps of: injecting a gaseous medium within said pathway toward said second end at a flow velocity substantially higher than the rate at which said tubular element is to be advanced therealong; inserting a free end of said tubular element into said pathway; and propelling said tubular element through said tubular pathway by continuing said injecting step so as to produce viscous drag forces distributed along the advancing length of the tubular element then disposed within the pathway while the tubular element advances at a velocity substantially less than the gaseous flow velocity until said free end of the tubular element reaches said second end of pathway.

* * * * *